(12) United States Patent
Ouyang et al.

(10) Patent No.: US 11,763,749 B2
(45) Date of Patent: Sep. 19, 2023

(54) ELECTRONIC DEVICE HAVING DISPLAY AREAS COUPLED WITH DIFFERENT POSITIVE AND NEGATIVE POWER SUPPLIES

(71) Applicant: Huawei Technologies Co., Ltd., Shenzhen (CN)

(72) Inventors: Shiangruei Ouyang, Shenzhen (CN); Chujung Shih, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/771,120

(22) PCT Filed: Oct. 12, 2020

(86) PCT No.: PCT/CN2020/120392
§ 371 (c)(1),
(2) Date: Apr. 22, 2022

(87) PCT Pub. No.: WO2021/078031
PCT Pub. Date: Apr. 29, 2021

(65) Prior Publication Data
US 2022/0383819 A1 Dec. 1, 2022

(30) Foreign Application Priority Data
Oct. 24, 2019 (CN) .................. 201911016882.X

(51) Int. Cl.
*G09G 3/3258* (2016.01)
*G09G 3/00* (2006.01)

(52) U.S. Cl.
CPC ........... *G09G 3/3258* (2013.01); *G09G 3/035* (2020.08); *G09G 2300/0809* (2013.01); *G09G 2330/028* (2013.01)

(58) Field of Classification Search
CPC ..................................................... G09G 3/3258
USPC ......................................................... 345/204
See application file for complete search history.

(56) References Cited

U.S. PATENT DOCUMENTS

| | | | |
|---|---|---|---|
| 2008/0172569 A1* | 7/2008 | Lee ......................... | H04M 1/22 345/82 |
| 2013/0335456 A1* | 12/2013 | Matsui ................. | G09G 3/3233 345/77 |
| 2014/0152576 A1 | 6/2014 | Kim et al. | |
| 2016/0218155 A1 | 7/2016 | Park et al. | |
| 2016/0232852 A1 | 8/2016 | An et al. | |

(Continued)

FOREIGN PATENT DOCUMENTS

| | | |
|---|---|---|
| CN | 101751860 A | 6/2010 |
| CN | 103729055 A | 4/2014 |

(Continued)

*Primary Examiner* — Long D Pham
(74) *Attorney, Agent, or Firm* — Conley Rose, P.C.

(57) ABSTRACT

A display system includes a display that has a first display area and a second display area. Each display area includes a plurality of subpixels, and each subpixel includes a light emitting device. A first power system is configured to output a first power supply positive voltage and a first power supply negative voltage to drive subpixels in the first display area. A second power system is configured to output a second power supply positive voltage and a second power supply negative voltage to drive subpixels in the second display area.

20 Claims, 7 Drawing Sheets

(56) References Cited

U.S. PATENT DOCUMENTS

| | | | |
|---|---|---|---|
| 2017/0061885 A1 | 3/2017 | Park et al. |
| 2018/0090067 A1 | 3/2018 | Oh et al. |
| 2019/0086992 A1 | 3/2019 | Lin et al. |
| 2020/0034100 A1 | 1/2020 | Fan et al. |
| 2021/0012734 A1 | 1/2021 | Shan |
| 2021/0327328 A1 | 10/2021 | Liu et al. |

FOREIGN PATENT DOCUMENTS

| | | |
|---|---|---|
| CN | 104732954 A | 6/2015 |
| CN | 105845082 A | 8/2016 |
| CN | 106409229 A | 2/2017 |
| CN | 106486067 A | 3/2017 |
| CN | 107871469 A | 4/2018 |
| CN | 108597436 A | 9/2018 |
| CN | 109584836 A | 4/2019 |
| CN | 109600459 A | 4/2019 |
| CN | 109981843 A | 7/2019 |
| CN | 110164398 A | 8/2019 |
| CN | 110189691 A | 8/2019 |
| CN | 110299095 A | 10/2019 |
| WO | 2019062213 A1 | 4/2019 |

* cited by examiner

ELECTRONIC DEVICE HAVING DISPLAY AREAS COUPLED WITH DIFFERENT POSITIVE AND NEGATIVE POWER SUPPLIES

CROSS-REFERENCE TO RELATED APPLICATIONS

This is a U.S. National Stage of International Patent Application No. PCT/CN2020/120392 filed on Oct. 12, 2020, which claims priority to Chinese Patent Application No. 201911016882.X filed on Oct. 24, 2019. Both of the aforementioned applications are hereby incorporated by reference in their entireties.

TECHNICAL FIELD

This application relates to the field of electronic devices, and in particular, to an electronic device and a display module thereof.

BACKGROUND

With development of electronic devices, there is an increasingly high requirement on a screen-to-body ratio of the electronic device, and a foldable electronic device emerges.

When the foldable electronic device is in a folded state, there is usually a case in which only a half of a folded screen or only a part of a screen is lit up. In this case, although no content is displayed in a screen area, of the electronic device, that is not lit up, a voltage is also generated in the screen area that is not lit up, which greatly increases power consumption of the electronic device.

SUMMARY

This application provides an electronic device and a display module thereof. Different power modules are configured for different displays in the display module to respectively provide drive voltages for the displays, so that when only one half of the display of the electronic device works, no drive voltage is provided for the other half of the display that does not work, to reduce power consumption of the entire electronic device.

According to a first aspect, a display module is provided, and includes: a display, where the display includes a first display area and a second display area, and each display area includes a plurality of subpixels; a first power module, configured to output a first power supply positive voltage and a first power supply negative voltage, where the first power supply positive voltage and the first power supply negative voltage are used to drive subpixels in the first display area; and a second power module, configured to output a second power supply positive voltage and a second power supply negative voltage, where the second power supply positive voltage and the second power supply negative voltage are used to drive subpixels in the second display area. The first power supply positive voltage is different from the second power supply positive voltage, and/or the first power supply negative voltage is different from the second power supply negative voltage.

Each subpixel may include an organic light-emitting diode OLED.

According to the display module in this embodiment of this application, power is independently supplied to a plurality of display areas, so that when only some of the display areas need to work, the other display areas can be in a power-off state. In this way, power consumption can be effectively reduced, and a service life of the display can be prolonged.

It should be understood that the technical solution provided in this embodiment of this application may be applied to a display module that includes a plurality of display areas.

With reference to the first aspect, in some implementations of the first aspect, the display is a flexible screen, and the first display area and the second display area are two foldable parts of the display along a bending area.

With reference to the first aspect, in some implementations of the first aspect, the first power supply positive voltage is an emission layer VDD ELVDD voltage, and the first power supply negative voltage is an emission layer VSS ELVSS voltage.

With reference to the first aspect, in some implementations of the first aspect, the second power supply positive voltage is an emission layer VDD ELVDD voltage, and the second power supply negative voltage is an emission layer VSS ELVSS voltage.

With reference to the first aspect, in some implementations of the first aspect, the ELVDD voltage is greater than the ELVSS voltage.

With reference to the first aspect, in some implementations of the first aspect, the display module further includes a processor, configured to: obtain use time of the plurality of subpixels in each display area, and control, based on the use time, a voltage output by a power module corresponding to each display area.

According to the display module in this embodiment of this application, the processor may obtain use time of subpixels in the plurality of display areas, and may further control, based on use time of the subpixels that is fed back by a reading module, a power module of the display area corresponding to the subpixels to output two different voltages to drive the subpixels in the display area, so that brightness of at least two display areas in the plurality of display areas is the same when the at least two display areas are lit up. The processor may be any chip with a processing function, for example, an application processor or a display driver integrated circuit.

According to a second aspect, an electronic device is provided, and includes: a display, where the display includes a first display area and a second display area, and each display area includes a plurality of subpixels; a first power module, configured to output a first power supply positive voltage and a first power supply negative voltage, where the first power supply positive voltage and the first power supply negative voltage are used to drive subpixels in the first display area; and a second power module, configured to output a second power supply positive voltage and a second power supply negative voltage, where the second power supply positive voltage and the second power supply negative voltage are used to drive subpixels in the second display area. The first power supply positive voltage is different from the second power supply positive voltage, and/or the first power supply negative voltage is different from the second power supply negative voltage.

Each subpixel includes an organic light-emitting diode OLED.

With reference to the second aspect, in some implementations of the second aspect, the display is a flexible screen, and the first display area and the second display area are two foldable parts of the display along a bending area.

With reference to the second aspect, in some implementations of the second aspect, the first power supply positive voltage is an emission layer VDD ELVDD voltage, and the first power supply negative voltage is an emission layer VSS ELVSS voltage.

With reference to the second aspect, in some implementations of the second aspect, the second power supply positive voltage is an emission layer VDD ELVDD voltage, and the second power supply negative voltage is an emission layer VSS ELVSS voltage.

With reference to the second aspect, in some implementations of the second aspect, the ELVDD voltage is greater than the ELVSS voltage.

With reference to the second aspect, in some implementations of the second aspect, the electronic device further includes a processor, configured to: obtain use time of the plurality of subpixels in each display area, and control, based on the use time, a voltage output by a power module corresponding to each display area.

According to a third aspect, a circuit system is provided, and includes a control circuit, configured to control a first power module and a second power module. The first power module is configured to output a first power supply positive voltage and a first power supply negative voltage. The first power supply positive voltage and the first power supply negative voltage are used to drive subpixels in a first display area of a display module. The second power module is configured to output a second power supply positive voltage and a second power supply negative voltage. The second power supply positive voltage and the second power supply negative voltage are used to drive subpixels in a second display area of the display module. The first power supply positive voltage is different from the second power supply positive voltage, and/or the first power supply negative voltage is different from the second power supply negative voltage.

With reference to the third aspect, in some implementations of the third aspect, the first power supply positive voltage is an emission layer VDD ELVDD voltage, and the first power supply negative voltage is an emission layer VSS ELVSS voltage.

With reference to the third aspect, in some implementations of the third aspect, the second power supply positive voltage is an emission layer VDD ELVDD voltage, and the second power supply negative voltage is an emission layer VSS ELVSS voltage.

With reference to the third aspect, in some implementations of the third aspect, the ELVDD voltage is greater than the ELVSS voltage.

With reference to the third aspect, in some implementations of the third aspect, the circuit system further includes a processor, configured to: obtain use time of a plurality of subpixels in each display area, and control, based on the use time, a voltage output by a power module corresponding to each display area.

DESCRIPTION OF EMBODIMENTS

The following describes technical solutions of this application with reference to accompanying drawings.

Figure 1:
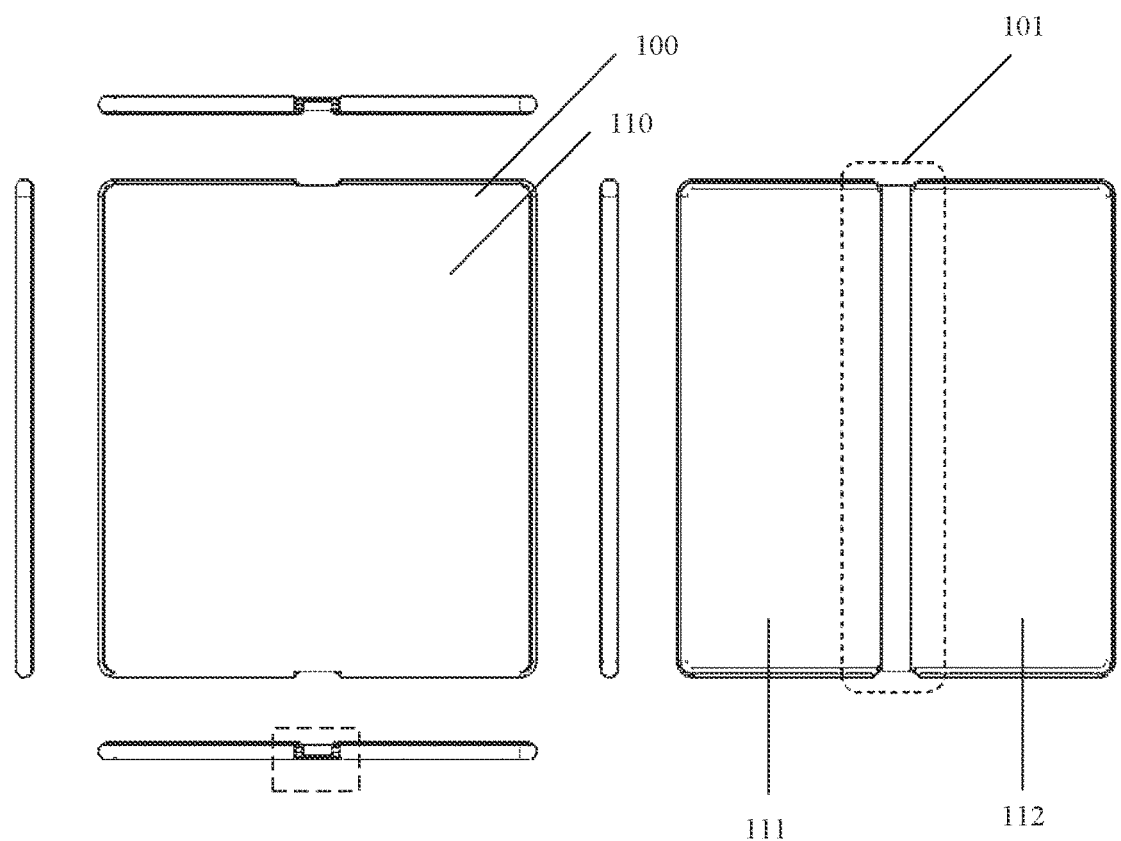
FIG. 1 is a schematic expanded diagram of a foldable electronic device according to an embodiment of this application.

FIG. 1 is a schematic expanded diagram of a foldable electronic device according to an embodiment of this application.

Schematic appearance diagrams of a front side, a back side, a bottom side, a top side, a left side and a right side of the electronic device are shown in FIG. 1. In the front view, 100 represents a foldable display module of the electronic device, and is configured to display an image. The display module may be connected to a middle frame of the electronic device, and is fastened by using the middle frame. The display module 100 may include a display 110. The display 110 may be flexible. The flexible display 110 may be stretched and bent. A bending area 101 of the electronic device is shown in a dashed-line box. The display 110 may be divided into two subunits, namely, a first display area 111 and a second display area 112, along the bending area. The display module 100 may further include a display driver circuit, for example, a display driver integrated circuit (display driver integrated circuit, DDIC), and may further include another component such as a gate array (gate on array, GOA).

It should be understood that the electronic device may include a plurality of bending areas 101, and the electronic device may be folded into a plurality of parts. For example, the electronic device may include two bending areas, the electronic device may be folded into three parts, and the display of the electronic device may also be folded into three parts.

Figure 2:
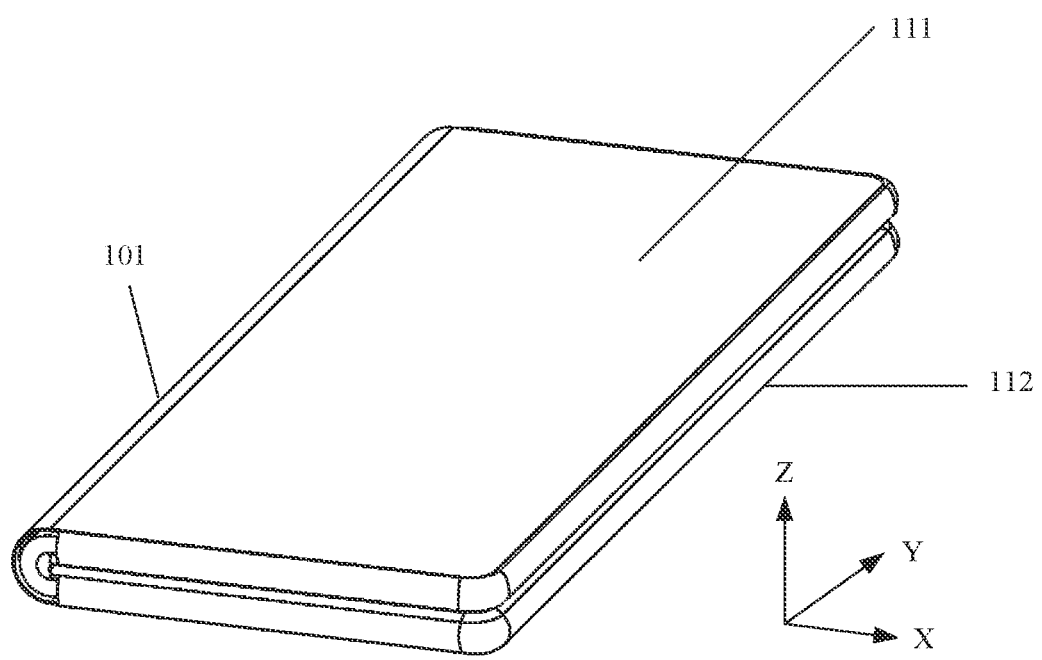
FIG. 2 is a schematic diagram of a foldable electronic device in a folded state according to an embodiment of this application.

FIG. 2 is a schematic diagram of a foldable electronic device in a folded state according to an embodiment of this application.

As shown in FIG. 2, the electronic device is configured as two parts along a bending area. When one part rotates to the folded state (0 degrees), a structure of the bending area 101 is deformed and the two parts are stacked. A bending structure may be a bending structure used in a known folding terminal. Details are not described herein. In addition, a component that can implement a rotational connection, for example, a common rotating shaft, may be used for a rotational connection between the two parts configured along the bending area.

It should be understood that for the foldable electronic device, the bending area 101 may be longitudinally distributed, and a flexible display 110 may be laterally folded along the longitudinally distributed bending area. Alternatively, the bending area 101 may be laterally distributed, and a flexible display 110 may be longitudinally folded along the laterally distributed bending area.

It should be further understood that in an expanded state, the foldable electronic device may be folded in a direction in which a left screen and a right screen face each other, or may be folded in a direction in which a left screen and a right screen are back to back.

It should be further understood that an example in which an electronic device is a mobile phone is used in FIG. 1 and FIG. 2. Actually, the electronic device in the technical solutions in the embodiments of this application may be user equipment, an access terminal, a subscriber unit, a subscriber station, a mobile station, a mobile console, a remote station, a remote terminal, a mobile device, a user terminal, a terminal, a wireless communication device, a user agent, or a user apparatus. The electronic device may alternatively be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, an electronic device in a future 5G network, or an electronic device in a future evolved public land mobile network (public land mobile network, PLMN). This is not limited in the embodiments of this application.

The foldable electronic device may be in the folded state and a non-folded state. The folded state may mean that a frame of the foldable electronic device approaches another frame of the foldable electronic device from a relatively long distance, and is sometimes referred to as a closed state. The non-folded state may be, for example, an initial state that is before the "approaching" process occurs and in which the flexible display is in an expanded state, that is, the first display area 111 and the second display area 112 are on a same horizontal plane, and sometimes may be referred to as an open state.

Figure 3:
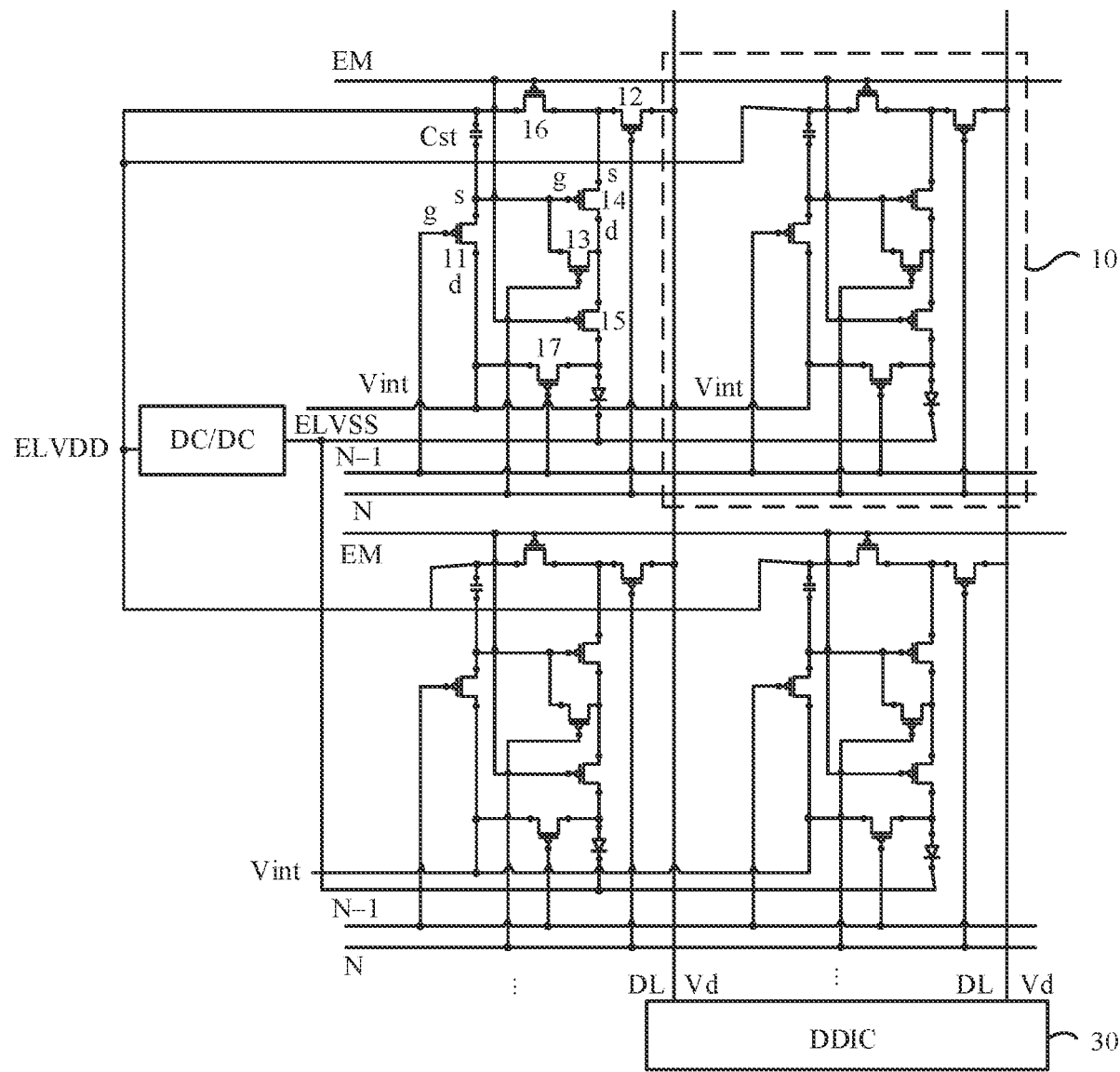
FIG. 3 is a schematic diagram of a pixel circuit of a display module of an electronic device according to an embodiment of this application.
Figure 4:
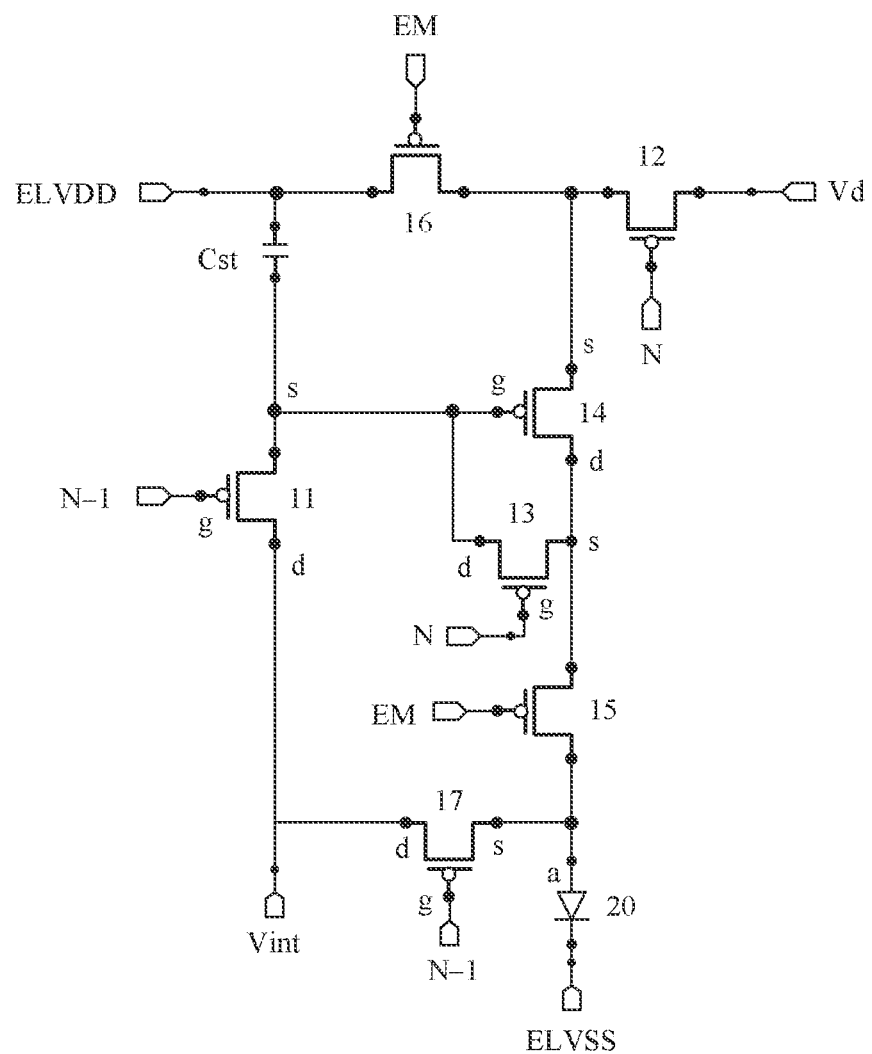
FIG. 4 is a schematic diagram of a single pixel circuit in FIG. 3.

FIG. 3 and FIG. 4 are schematic diagrams of a pixel circuit of a display module of an electronic device according to this application. FIG. 3 is a schematic diagram of an overall pixel circuit, and FIG. 4 is a schematic diagram of an internal circuit of a single pixel.

As shown in FIG. 4, for ease of understanding, a structure of seven transistors and one capacitor (7 transistors and 1 capacitance, 7T1C) is used as an example. A specific pixel circuit structure is not limited in this application. The pixel circuit in FIG. 4 may include a capacitor Cst, a plurality of transistors, and a light emitting device 20. The light emitting device 20 may be an organic light-emitting diode (organic light emitting diode, OLED). In this case, the display module is an OLED display. Alternatively, the light emitting device 20 may be a micro light-emitting diode (micro light emitting diode, micro LED). In this case, the display module is a micro LED display. The display module can emit light. For ease of description, an example in which the light emitting device 20 is an OLED is used for description.

In addition, the display module further includes a backplate configured to carry the pixel circuit 10. In some embodiments of this application, the backplate may be made of a flexible material. The flexible material may be flexible glass or polyimide (polyimide, PI). Alternatively, in some other embodiments of this application, the backplate may be made of a tensile material. A deformation rate of the tensile material may be greater than or equal to 5%. For example, the tensile material may be polydimethylsiloxane (polydimethylsiloxane, PDMS). In this case, the display module may be a flexible display that can be stretched and bent. An electronic device with the flexible display may be a folding mobile phone or a folding tablet.

Alternatively, the backplate may be made of a relatively hard material, for example, hard glass or sapphire. In this case, the display module is a hard display.

Based on the structure of the pixel circuit shown in FIG. 4, a working process of the pixel circuit includes three phases: a first phase (1), a second phase (2), and a third phase (3).

In the first phase (1), a first reset transistor 11 and a second reset transistor 17 are conducted under control of a gating signal N−1. An initial voltage (Vint) is transmitted to a gate of a drive transistor 14 by using the first reset transistor 11, to reset the gate of the drive transistor 14. In addition, the initial voltage Vint is transmitted to an anode (anode, a) of the OLED 20 by using the second reset transistor 17, to reset the anode a of the OLED 20. In this case, a voltage Va on the anode a of the OLED 20 and a voltage Vg4 on the gate g of the drive transistor 14 are Vint.

In this way, in the first stage (1), the voltage on the gate g of the drive transistor 14 and the voltage on the anode a of the OLED 20 may be reset to the initial voltage Vint, to prevent a voltage that is for a previous image frame and that remains on the gate g of the drive transistor 14 and the anode a of the OLED from affecting a current image frame. Therefore, the first phase (1) may be referred to as a reset phase.

In the second phase (2), a first transistor 12 and a second transistor 13 are conducted under control of a gating signal N. When the second transistor 13 is conducted, the gate g of the drive transistor 14 is coupled to a drain (drain, d for short) of the drive transistor 14, and the drive transistor 14 is in a diode-on state. In this case, a data voltage (Vd) is written to a source s of the drive transistor 14 by using the conducted first transistor 12. Therefore, the second phase (2) may be referred to as a phase of writing the data voltage Vd in the pixel circuit.

The data voltage Vd may be provided by a DDIC 30 in the electronic device.

In this case, a voltage Vs4 on the source s of the drive transistor 14 is equal to Vd. It may be learned from a conduction feature of a transistor that a voltage Vd4 on the drain d of the drive transistor 14 is equal to Vd−|Vth_14|. The second transistor 13 is conducted, and therefore the voltage Vg4 on the gate g of the drive transistor 14 is the same as the voltage Vd4 on the drain d of the drive transistor 14.

Therefore, the voltage Vg4 on the gate g of the drive transistor 14 is equal to Vd−|Vth_14|. In this way, the voltage Vg4 on the gate of the drive transistor 14 is related to the threshold voltage Vth_14 of the drive transistor 14, to compensate for the threshold voltage Vth_14.

In the third phase (3), under control of a light emitting control signal EM, a second light emitting control transistor 15 and a first light emitting control transistor 16 are conducted, and a current path between a first power supply voltage ELVDD and a second power supply voltage ELVSS is conducted. A drive current 1 generated by the drive transistor 14 is transmitted to the OLED 20 by using the current path, to drive the OLED 20 to emit light.

A source-to-gate voltage Vsg4 of the drive transistor 14 is equal to Vs4−Vg4=ELVDD−(Vd−|Vth_14|). In addition, a current that drives the OLED 20 to emit light meets the following formula:

$$Isd = \tfrac{1}{2} \times \mu \times Cgi \times W/L \times (Vsg4 - |Vth\_14|)^2 \qquad (1)$$

It may be learned from the current formula of the OLED that the drive current Isd that flows through the OLED is equal to $\tfrac{1}{2} \times \mu \times Cgi \times W/L \times (ELVDD - Vd + |Vth\_14| - |Vth\_14|)^2 = \tfrac{1}{2} \times \mu \times Cgi \times W/L \times (ELVDD - Vd)^2$.

Herein, μ represents carrier mobility of the drive transistor 14, Cgi represents a capacitance between the gate g of the drive transistor 14 and a channel, W/L represents a width-to-length ratio of the drive transistor 14, and Vth_14 represents the threshold voltage of the drive transistor 14.

The current Isd is independent of the threshold voltage Vth_14 of the drive transistor 14, and therefore a problem that there is non-uniform brightness due to a difference in threshold voltages of drive transistors of subpixels can be resolved. Therefore, after compensation is made for the threshold voltage in the second phase (2), an effect of achieving uniform brightness of a display 10 may be reflected in the third phase (3). The OLED emits light in the third phase (3), and therefore the third phase (3) may be referred to as a light emitting phase.

Based on the structure of the circuit, subpixel circuits in the display module perform scanning and emit light row by row. Therefore, to display a frame of image, after a single pixel circuit 10 in the first row emits light, a light-emitting state needs to be kept until a pixel circuit 10 in the last row emits light. Therefore, when the foldable electronic device is in a folded state, there is usually a case in which only a half of the folded screen or only a part of the screen is lit up. In this case, although no content is displayed in a screen area, of the electronic device, that is not lit up, a voltage is also generated in the screen area that is not lit up, which greatly increases power consumption of the electronic device.

This application provides a technical solution in which different power modules are configured for different displays in a display module to respectively provide drive voltages for the displays, so that when only one half of the display of an electronic device works, no drive voltage is provided for the other half of the display that does not work, to reduce power consumption of the entire electronic device.

Figure 5:
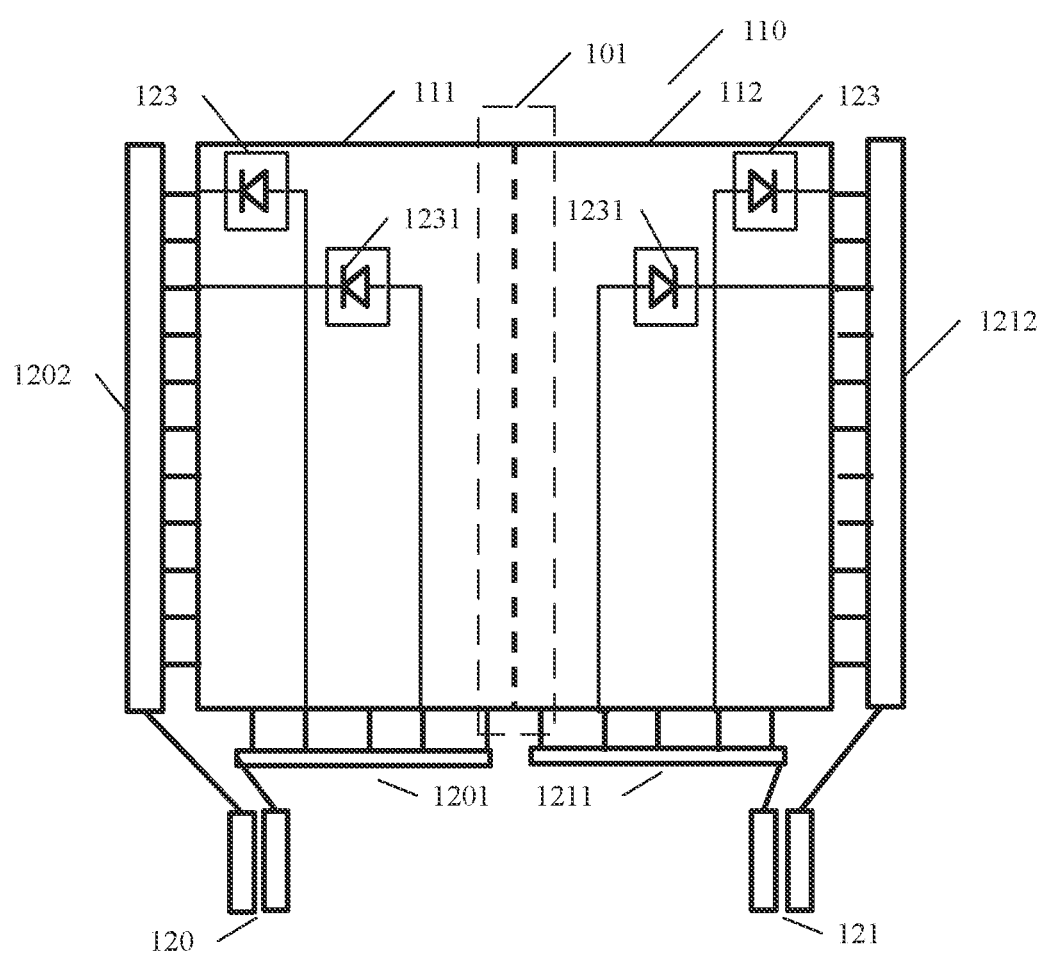
FIG. 5 is a schematic structural diagram of a foldable display module according to an embodiment of this application.

FIG. 5 is a schematic structural diagram of a display module according to an embodiment of this application.

In an example, the display module provided in this embodiment includes only one bending area 101. In actual application, the display module may include a plurality of bending areas 101. The display module may be configured as a plurality of foldable parts along the plurality of bending areas 101. A quantity of bending areas is not limited herein.

As shown in FIG. 5, the display module may include a flexible display 110 and two power modules.

The display 110 may be configured as a first display area 111 and a second display area 112 along the bending area 101. The first display area 111 and the second display area 112 each include a plurality of subpixels 123, and each subpixel 123 includes an organic light-emitting diode (organic light emitting diode, OLED) 1231. The two power modules are a first power module 120 and a second power module 121. The first power module 120 corresponds to the first display area 111, and the first unit module 120 outputs two different voltages to drive a plurality of subpixels 123 in the first display area 111. The second power module 121 corresponds to the second display area 112, and the second power module 121 outputs two different voltages to drive a plurality of subpixels 123 in the second display area 112.

It should be understood that the subpixel 123 may be the single subpixel circuit in FIG. 3, and each subpixel 123 can be driven by only one power module.

Optionally, the first power module 120 may output a first power supply positive voltage 1201 and a first power supply negative voltage 1202 to drive the plurality of subpixels 123 in the first display area 111. The first power supply positive voltage 1201 may be greater than the first power supply negative voltage 1202.

Optionally, the first power supply positive voltage 1201 may be electrically connected to a positive electrode (or referred to as an anode) of an OLED 1231 included in the subpixel 123 in the first display area 111, and the first power supply negative voltage 1202 may be electrically connected to a negative electrode (or referred to as a cathode) of the OLED 1231 included in the subpixel 123 in the first display area 111.

Optionally, the first power supply positive voltage 1201 may be emission layer VDD (emission layer VDD, ELVDD), and the first power supply negative voltage 1202 may be emission layer VSS (emission layer VSS, ELVSS).

Optionally, the ELVDD and the ELVSS may be provided by a power direct current/direct current (direct current/direct current, DC/DC) chip in an electronic device.

Optionally, the second power module 121 may output a second power supply positive voltage 1211 and a second power supply negative voltage 1212 to drive the plurality of subpixels 123 in the second display area 112. The second power supply positive voltage 1211 may be greater than the second power supply negative voltage 1212.

Optionally, the second power supply positive voltage 1211 may be electrically connected to a positive electrode of an OLED 1231 included in the subpixel 123 in the second display area 112, and the second power supply negative voltage 1212 may be electrically connected to a negative electrode of the OLED 1231 included in the subpixel 123 in the second display area 112.

Optionally, the second power supply positive voltage 1211 may be ELVDD, and the second power supply negative voltage 1212 may be ELVSS.

Optionally, the first power supply positive voltage is different from the second power supply positive voltage, and/or the first power supply negative voltage is different from the second power supply negative voltage.

Optionally, the first power module 120 and the second power module 121 may be integrated into a same power management chip, or each of the first power module 120 and the second power module 121 may be located in a DC/DC chip, a DDIC, or an application processor (application processor, AP).

A corresponding power module is configured for each display area of the display in the display module, so that when each display area is independently used, power modules corresponding to all other display areas provide no voltage. In this embodiment, power is independently supplied to each display area, to reduce power consumption when the display area is independently used. In addition, the subpixel is powered on for a shorter time, and therefore a service life of the subpixel can be prolonged.

It should be understood that the technical solution provided in this embodiment of this application may also be applied to a display module that cannot be folded, and power may be supplied to the display module by using a plurality of power modules for display by area.

Figure 6:
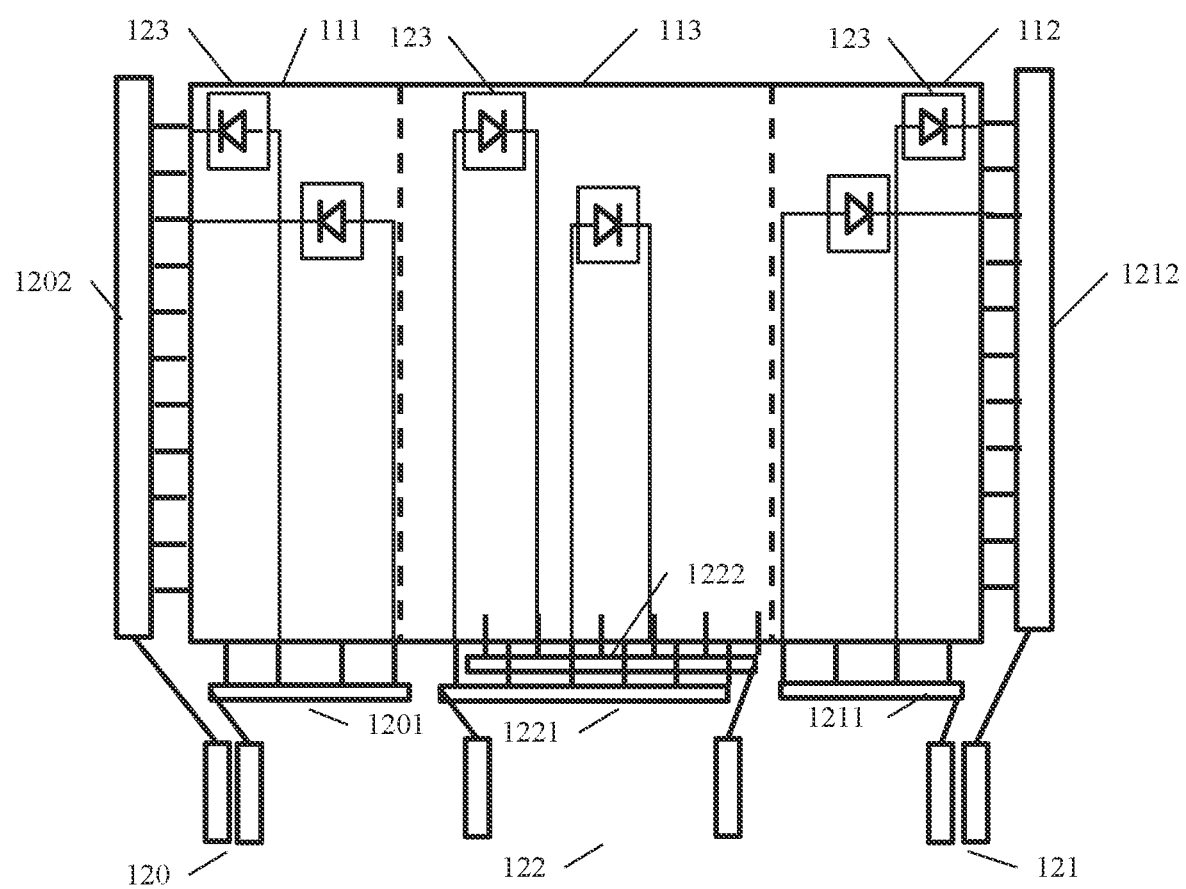
FIG. 6 is a schematic structural diagram of another foldable display module according to an embodiment of this application.

FIG. 6 is a schematic structural diagram of a display module according to an embodiment of this application.

As shown in FIG. 6, the display module may include a flexible display and three power modules.

The display 110 may be configured as a first display area 111, a second display area 112, and a third display area 113 along a bending area. The first display area 111, the second display area 112, and the third display area 113 each include a plurality of subpixels 123, and each subpixel 123 includes an OLED 1231. The three power modules include a first power module 120, a second power module 121, and a third power module 122. The first power module 120 corresponds to the first display area 111, and the first unit module 120 outputs two different voltages to drive a plurality of subpixels 123 in the first display area 111. The second power module 121 corresponds to the second display area 112, and the second power module 121 outputs two different voltages to drive a plurality of subpixels 123 in the second display area 112. The third power module 122 corresponds to the third display area 113, and the third power module 122 outputs two different voltages to drive a plurality of subpixels 123 in the third display area 113.

It should be understood that the subpixel 123 may be the single subpixel circuit in FIG. 3, and each subpixel 123 can be driven by only one power module.

Optionally, the first power module 120 may output a first power supply positive voltage 1201 and a first power supply negative voltage 1202 to drive the plurality of subpixels 123 in the first display area 111. The first power supply positive voltage 1201 may be greater than the first power supply negative voltage 1202.

Optionally, the first power supply positive voltage 1201 may be electrically connected to a positive electrode of an OLED 1231 included in the subpixel 123 in the first display area 111, and the second power supply negative voltage 1202 may be electrically connected to a negative electrode of the OLED 1231 included in the subpixel 123 in the first display area 111.

Optionally, the first power supply positive voltage 1201 may be ELVDD, and the first power supply negative voltage 1202 may be ELVSS.

Optionally, the ELVDD and the ELVSS may be provided by a DC/DC chip in an electronic device.

Optionally, the second power module 121 may output a second power supply positive voltage 1211 and a second power supply negative voltage 1212 to drive the plurality of subpixels 123 in the second display area 112. The second power supply positive voltage 1211 may be greater than the second power supply negative voltage 1212.

Optionally, the second power supply positive voltage 1211 may be electrically connected to a positive electrode of an OLED 1231 included in the subpixel 123 in the second display area 112, and the second power supply negative voltage 1212 may be electrically connected to a negative electrode of the OLED 1231 included in the subpixel 123 in the second display area 112.

Optionally, the second power supply positive voltage 1211 may be ELVDD, and the second power supply negative voltage 1212 may be ELVSS.

Optionally, the third power module 122 may output a third power supply positive voltage 1221 and a third power supply negative voltage 1222 to drive the plurality of subpixels 123 in the third display area 113. The third power supply positive voltage 1221 may be greater than the third power supply negative voltage 1222.

Optionally, the third power supply positive voltage 1221 may be electrically connected to a positive electrode of an OLED 1231 included in the subpixel 123 in the third display area 113, and the third power supply negative voltage 1222 may be electrically connected to a negative electrode of the OLED 1231 included in the subpixel 123 in the third display area 113.

Optionally, the third power supply positive voltage 1221 may be ELVDD, and the third power supply negative voltage 1222 may be ELVSS.

Optionally, the first power module 120, the second power module 121, and the third power module 122 may be integrated into a same power management chip, or each of the first power module 120, the second power module 121, and the third power module 122 may be located in a DC/DC chip, a DDIC, or an AP.

A corresponding power module is configured for each display area of the display in the display module, so that when each display area is independently used, power modules corresponding to all other display areas provide no voltage. In this embodiment, power is independently supplied to each display area, to reduce power consumption when the display area is independently used. In addition, the subpixel is powered on for a shorter time, and therefore a service life of the subpixel can be prolonged.

Figure 7:
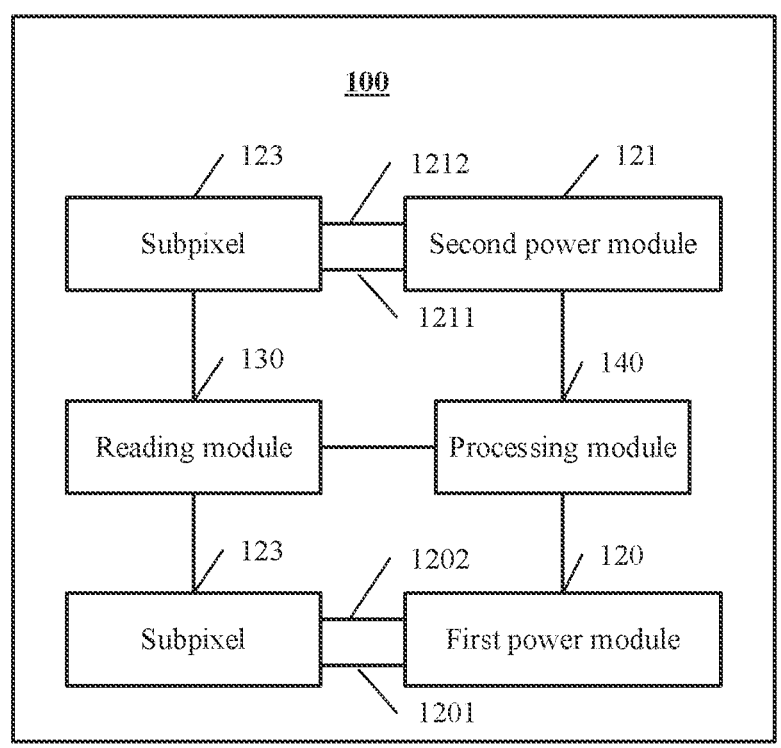
FIG. 7 is a schematic circuit diagram of a foldable display module according to an embodiment of this application.

FIG. 7 is a schematic diagram of a circuit structure of a display module according to an embodiment of this application.

In an example, the display module provided in this embodiment includes only one bending area 101. In actual application, the display module may include a plurality of bending areas 101. The display module may be configured as a plurality of foldable parts along the plurality of bending areas 101. A quantity of bending areas is not limited herein.

As shown in FIG. 7, the display module 100 may include a reading module 130 and a processing module 140. The reading module 130 and the processing module 140 may be circuits integrated into any processing chip with a processing function.

Optionally, the processing chip may be an AP or a DDIC.

The reading module 130 may be electrically connected to a subpixel 123, and may be configured to obtain use time of the subpixel 123. The use time may be total time of powering on the subpixel 123. The processing module 140 may control, by using use time fed back by the reading module 130, voltages output by a first power module 120 and a second power module 121 to drive a plurality of subpixels 123 in a first display area and a second display area corresponding to the first power module 120 and the second power module 121.

It should be understood that a subpixel ages with use time, and when a same voltage is applied to the subpixel, brightness of the subpixel dims. The first display area and the second display area in the foldable display module may be used separately, and therefore the subpixels in the first display area and the second display area may differ in use time. Therefore, when a same drive voltage is applied to the plurality of subpixels in the first display area and the second display area, the first display area and the second display area differ in brightness.

Optionally, the reading module 130 in the processing chip may estimate the use time of the subpixel 123 based on an aging degree of the subpixel 123. For example, a correspondence between the aging degree of the subpixel 123 and the use time may be pre-stored in the processing chip. For example, the use time may be calculated by using the following formula:

$$coef = \exp\left(-\left(\frac{t}{\tau}\left(\frac{DBV}{DBV\_max}\left(\frac{Lev}{Lev\_max}\right)^\gamma\right)^k\right)^\beta\right) \qquad (2)$$

Herein, coef represents an attenuation ratio of each primary color in the display area, $\gamma$ represents a gamma value of a display, $\tau$, k, and $\beta$ are constants, $\tau$ represents a parameter related to a life and initial brightness of an OLED device in the display, $\beta$ represents a parameter related to a material and a manufacturing process of the OLED device, and k represents an aging acceleration factor of the OLED device.

Optionally, the reading module 130 in the processing chip may record accumulated time of lighting up a display area, to obtain use time of a subpixel in the display area.

Optionally, the accumulated time of lighting up the display area may be stored in a memory or any chip with a storage function.

The processing module 140 may control, based on use time that is of the subpixel in the first display area and that is fed back by the reading module 130, a first power supply positive voltage 1201 and a first power supply negative voltage 1202 output by the first power module, and control, by controlling a voltage difference between the first power supply positive voltage 1201 and the first power supply negative voltage 1202, brightness of the subpixel corresponding to the first power supply positive voltage 1201 and the first power supply negative voltage 1202. The processing module 140 may control, based on use time that is of the subpixel in the second display area and that is fed back by the reading module 130, a second power supply positive voltage 1211 and a second power supply negative voltage 1212 output by the second power module, and control, by controlling a voltage difference between the second power supply positive voltage 1211 and the second power supply negative voltage 1212, brightness of the subpixel corresponding to the second power supply positive voltage 1201 and the second power supply negative voltage 1202. The processing module 140 may control, by using the use time of the subpixel that is fed back by the reading module 130, the voltage output by the power module, so that when both the first display area and the second display area work, brightness of the first display area and the second display area is the same. For example, a correspondence that is between brightness of the subpixel 123 and a voltage and that is obtained after the subpixel 123 is used for a specific time may be pre-stored in the AP, and the processing module 140 may determine the correspondence between the brightness of the subpixel 123 and the voltage based on the use time, to adjust a voltage output of the subpixel 123. Usually, when a same voltage is output, longer use time of the subpixel 123 indicates lower brightness of the subpixel 123. To maintain same brightness, the voltage output needs to be increased.

It should be understood that FIG. 7 is merely a possible connection manner, and there may be another connection manner. For example, the reading module may not be directly electrically connected to the subpixel, but obtains the use time of the subpixel by using the power module.

Optionally, the display module may include a plurality of bending areas, and the display module may be folded into a plurality of display areas along the bending areas. The reading module obtains use time of subpixels in the plurality of display areas. The processing module may control, based on the use time of the subpixels that is fed back by the reading module, a power module of the display area corresponding to the subpixels to output two different voltages to drive the subpixels in the display area, so that when at least two display areas in the plurality of display areas are lit up, brightness of the at least two display areas is the same.

Optionally, the first power supply positive voltage is different from the second power supply positive voltage and a third power supply positive voltage, and/or the first power supply negative voltage is different from the second power supply negative voltage and a third power supply negative voltage.

A corresponding power module is configured for each display area of the display in the display module, so that when each display area is used, an output voltage of the power module corresponding to the display area can be adjusted, to ensure same brightness for all the used display areas. In this embodiment, power is independently supplied to each display area to separately compensate for subpixels in each display area, so as to improve user experience.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, the embodiments may be implemented all or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state drive, SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A display system comprising:
   a display comprising:
      a first display area comprising a plurality of first subpixels; and
      a second display area comprising a plurality of second subpixels;
   a first power input coupled to the display and configured to receive a first power supply positive voltage and a first power supply negative voltage to drive the first subpixels;
   a second power input coupled to the display and configured to receive a second power supply positive voltage and a second power supply negative voltage to drive the second subpixels, wherein the first power supply positive voltage is different from the second power supply positive voltage, and wherein the first power supply negative voltage is different from the second power supply negative voltage; and
   a processor coupled to the display and configured to:
      obtain a first use time of the first subpixels;
      obtain a second use time of the second subpixels; and
      control, based on the first use time and the second use time, voltage inputs corresponding to each of the first display area and the second display area.

2. The display system of claim 1, wherein the first power supply positive voltage is an emission layer voltage drain drain (VDD) (ELVDD) voltage, and wherein the first power supply negative voltage is an emission layer voltage source source (VSS) (ELVSS) voltage.

3. The display system of claim 2, wherein the ELVDD voltage is greater than the ELVSS voltage.

4. The display system of claim 2, wherein each of the first subpixels and each of the second subpixels comprises:
   a light emitting device;
   a drive transistor coupled to the light emitting device;
   a first reset transistor and a second reset transistor in a configuration such that an initial voltage from a power input is coupled with the drive transistor and the light-emitting device;
   a first data transistor and a second data transistor in a configuration controllable such that a data voltage is coupled with the drive transistor; and
   a first light emitting transistor and a second light emitting transistor coupled with the first ELVDD and the second ELVSS such that a drive current is coupled to the light emitting device.

5. The display system of claim 1, wherein the second power supply positive voltage is an emission layer voltage drain drain (VDD) (ELVDD) voltage, and wherein the second power supply negative voltage is an emission layer voltage source source (VSS) (ELVSS) voltage.

6. The display system of claim 1, wherein each of the first subpixels and each of the second subpixels is configured to provide a reset phase, a data writing phase, and a lighting phase.

7. The display system of claim 1, further comprising a bending area disposed between the first display area and the second display area.

8. An electronic device comprising:
   a display system comprising:
      a first display area comprising a plurality of first subpixels; and
      a second display area comprising a plurality of second subpixels;
   a first power supply coupled to the display and configured to output a first power supply positive voltage and a first power supply negative voltage to drive the first subpixels;
   a second power supply coupled to the display and configured to output a second power supply positive voltage and a second power supply negative voltage to drive the second subpixels, wherein the first power supply positive voltage is different from the second power supply positive voltage, and wherein the first power supply negative voltage is different from the second power supply negative voltage; and
   a processor coupled to the display and configured to:
      obtain a first use time of the first subpixels;
      obtain a second use time of the second subpixels; and
      control, based on the first use time and the second use time, voltage output by the power supplies corresponding to each of the first display area and the second display area.

9. The electronic device of claim 8, wherein the first power supply positive voltage is an emission layer voltage drain drain (VDD) (ELVDD) voltage, and wherein the first power supply negative voltage is an emission layer voltage source source (VSS) (ELVSS) voltage.

10. The electronic device of claim 9, wherein the ELVDD voltage is greater than the ELVSS voltage.

11. The electronic device of claim 9, wherein each of the first subpixels and each of the second subpixels comprises:
   a light emitting device;
   a drive transistor coupled to the light emitting device;
   a first reset transistor and a second reset transistor in a configuration such that an initial voltage from the power supply is coupled with the light emitting device and the drive transistor;
   a first data transistor and a second data transistor in a configuration such that a data voltage is coupled with the drive transistor; and
   a first light emitting transistor and a second light emitting transistor coupled with the first ELVDD and the second ELVSS such that a drive current is coupled to the light emitting device.

12. The electronic device of claim 8, wherein the second power supply positive voltage is an emission layer voltage drain drain (VDD) (ELVDD) voltage, and wherein the second power supply negative voltage is an emission layer voltage source source (VSS) ELVSS voltage.

13. The electronic device of claim 8, wherein each of the first subpixels and each of the second subpixels is configured to provide a reset phase, a data writing phase, and a lighting phase.

14. The electronic device of claim 8, further comprising a bending area disposed between the first display area and the second display area.

15. A circuit system comprising:
- a first power system configured to output a first power supply positive voltage and a first power supply negative voltage to drive a plurality of first subpixels in a first display area of a display system;
- a second power system, configured to output a second power supply positive voltage and a second power supply negative voltage to drive a plurality of second subpixels in a second display area of the display system;
- a control circuit configured to control the first power system wherein the first power supply positive voltage is different from the second power supply positive voltage, and wherein the first power supply negative voltage is different from the second power supply negative voltage; and
- a processor coupled to the control circuit and configured to:
  - obtain a first use time of the first subpixels;
  - obtain a second use time of the second subpixels; and
  - control, based on the first use time and the second use time, voltage output by the power system corresponding to each display area.

16. The circuit system of claim 15, wherein the first power supply positive voltage is an emission layer voltage drain drain (VDD) (ELVDD) voltage, and wherein the first power supply negative voltage is an emission layer voltage source source (VSS) (ELVSS) voltage.

17. The circuit system of claim 16, wherein the ELVDD voltage is greater than the ELVSS voltage.

18. The circuit system of claim 16, wherein each of the first subpixels and each of the second subpixels comprises:
- a light emitting device;
- a drive transistor coupled to the light emitting device;
- a first reset transistor and a second reset transistor in a configuration such that an initial voltage from the power supply is coupled with the light emitting device and the drive transistor;
- a first data transistor and a second data transistor in a configuration such that a data voltage is coupled with the drive transistor; and
- a first light emitting transistor and a second light emitting transistor coupled with the first ELVDD and the second ELVSS such that a drive current is coupled to the light emitting device.

19. The circuit system according to claim 15, wherein the second power supply positive voltage is an emission layer voltage drain drain (VDD) (ELVDD) voltage, and wherein the second power supply negative voltage is an emission layer voltage source source (VSS) (ELVSS) voltage.

20. The circuit system of claim 15, wherein each of the first subpixels and each of the second subpixels is configured to provide a reset phase, a data writing phase, and a lighting phase.

* * * * *